United States Patent
Blok et al.

(10) Patent No.: US 9,840,569 B2
(45) Date of Patent: Dec. 12, 2017

(54) SPACER GROUPS FOR FUNCTIONALIZED RESINS IN TIRES

(71) Applicant: ExxonMobil Chemical Patents Inc., Baytown, TX (US)

(72) Inventors: Edward J. Blok, Huffman, TX (US); Ian C. Stewart, Houston, TX (US); David T. Harris, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 15/118,701

(22) PCT Filed: Mar. 6, 2015

(86) PCT No.: PCT/US2015/019170
§ 371 (c)(1),
(2) Date: Aug. 12, 2016

(87) PCT Pub. No.: WO2015/153055
PCT Pub. Date: Oct. 8, 2015

(65) Prior Publication Data
US 2017/0051085 A1 Feb. 23, 2017

Related U.S. Application Data

(60) Provisional application No. 61/972,970, filed on Mar. 31, 2014.

(51) Int. Cl.
| | | |
|---|---|---|
| *C08F 8/42* | (2006.01) | |
| *B60C 1/00* | (2006.01) | |
| *C08L 9/06* | (2006.01) | |
| *C08L 9/00* | (2006.01) | |
| *C08L 45/00* | (2006.01) | |
| *C08K 3/36* | (2006.01) | |

(52) U.S. Cl.
CPC .............. *C08F 8/42* (2013.01); *B60C 1/0016* (2013.01); *C08L 9/06* (2013.01); *C08F 2810/30* (2013.01); *C08F 2810/40* (2013.01); *C08L 2205/025* (2013.01)

(58) Field of Classification Search
CPC .... C08F 8/42; C08F 2810/30; C08F 2810/40; B60C 1/0016; C08L 9/06; C08L 2205/025
USPC ........................................................ 524/518
See application file for complete search history.

(56) References Cited

U.S. PATENT DOCUMENTS

| | | | |
|---|---|---|---|
| 5,194,489 A | 3/1993 | Frances et al. | |
| 6,300,449 B2 | 10/2001 | Wideman et al. | |
| 2010/0113703 A1 | 5/2010 | Houjo et al. | |
| 2013/0220516 A1* | 8/2013 | Uhl .................. | B29B 9/065 |
| | | | 156/110.1 |
| 2014/0144573 A1* | 5/2014 | Blok .................. | B29B 9/065 |
| | | | 156/110.1 |

FOREIGN PATENT DOCUMENTS

| | | | |
|---|---|---|---|
| EP | 0 260 103 | 3/1988 | |
| EP | 0260103 A1 * | 3/1988 | ............... C08F 8/42 |
| EP | 2 423 239 | 2/2012 | |
| FR | 2384816 | 10/1978 | |
| JP | 2000336152 | 12/2000 | |
| WO | 91/08240 | 6/1991 | |
| WO | WO 9108240 A1 * | 6/1991 | ............... C08F 8/42 |
| WO | 2010/125123 | 11/2010 | |
| WO | 2010/125124 | 11/2010 | |
| WO | 2012/050667 | 4/2012 | |
| WO | WO 2012050667 A1 * | 4/2012 | ............. C08F 10/14 |
| WO | 2015/084436 | 6/2015 | |

* cited by examiner

*Primary Examiner* — Michael M Bernshteyn
(74) *Attorney, Agent, or Firm* — Priya G. Prasad

(57) ABSTRACT

This invention relates to a functionalized resin composition having the formula P—S—X where S is a spacer selected from at least one of $C_2$-$C_{40}$ straight chain and branched alkyl, $C_6$-$C_{40}$ aromatics, butadiene, isoprene, and combinations thereof, P is a polymer backbone selected from at least one of dicyclopentadiene (DCPD)-based polymers, cyclopentadiene (CPD)-based polymers, DCPD-styrene copolymers, $C_5$ homopolymers and copolymer resins, $C_5$-styrene copolymer resins, terpene homopolymer or copolymer resins, pinene homopolymer or copolymer resins, $C_9$ homopolymers and copolymer resins, $C_5$/$C_9$ copolymer resins, alpha-methylstyrene homopolymer or copolymer resins, and combinations thereof, and X is a silane.

4 Claims, No Drawings ns, alpha-methylstyrene homopolymer or copolymer resins, and combinations thereof, and X is a silane.

This invention further relates to a tire tread composition comprising (i) a functionalized resin composition within the range from 5 to 100 phr; (ii) 100 phr of a diene elastomer; and (iii) an inorganic filler within the range from 50 to 150 phr; wherein the functionalized resin composition has the formula P—S—X where S is a spacer selected from the group consisting of $C_2$-$C_{40}$ straight chain and branched alkyl, $C_6$-$C_{40}$ aromatics, butadiene, isoprene, and combinations thereof, P is a polymer backbone, and X is a silane.

SPACER GROUPS FOR FUNCTIONALIZED RESINS IN TIRES

CROSS REFERENCE TO RELATED APPLICATION

This application is a National Stage Application of International Application No. PCT/US2015/019170, filed Mar. 6, 2015, and claims priority to U.S. Provisional Patent Application No. 61/972,970, filed Mar. 31, 2014, the disclosures of which are fully incorporated herein by reference in their entireties.

FIELD OF THE INVENTION

This invention relates to the use of a spacer group between a resin molecule and a reactive functional group for use in tire compound applications.

BACKGROUND

Treads of high performance tires are expected to have outstanding traction and handling properties. Generally, tire treads are compounded with high filler loading and resins to achieve these desired properties.

For passenger tires, miscible resins are typically used in tread compound formulations in order to increase traction characteristics. Although these resins increase overall traction, tread compounds formulated with these miscible resins tend to suffer from reduced traction and handling at high speeds or at high internal tire generated temperatures during hard driving.

The problems observed in passenger tires at high speeds and temperatures have been solved by adding high softening point immiscible resins and resin blends to tread compounds for use in race car tires. For instance, it has been observed that using resin packages with high G' (storage modulus) values at high temperatures along with high tangent delta (ratio of loss modulus to storage modulus) values improve tire performance at high speeds and temperatures. However, since adding immiscible resins reduces the life of the tire tread, using immiscible resins for high performance passenger tires is not a viable option because of the increased stability and lifetime requirements of passenger tires versus those of race car tires.

Patent Application No. PCT/US2014/050475 discloses DCPD-based functionalized resins prepared via metathesis chemistry. There still remains a need for a resin that demonstrates improved durability along with improved traction and handling in a cost effective manner.

SUMMARY OF THE INVENTION

The foregoing and/or other challenges are addressed by the methods and products disclosed herein.

This invention relates to a functionalized resin composition having the formula P—S—X where S is a spacer selected from at least one of $C_2$-$C_{40}$ straight chain and branched alkyl, $C_6$-$C_{40}$ aromatics, butadiene, isoprene, and combinations thereof, P is a polymer backbone selected from at least one of dicyclopentadiene (DCPD)-based polymers, cyclopentadiene (CPD)-based polymers, DCPD-styrene copolymers, $C_5$ homopolymers and copolymer resins, $C_5$-styrene copolymer resins, terpene homopolymer or copolymer resins, pinene homopolymer or copolymer resins, $C_9$ homopolymers and copolymer resins, $C_5$/$C_9$ copolymer res-

DETAILED DESCRIPTION

Various specific embodiments of the invention will now be described, including preferred embodiments and definitions that are adopted herein for purposes of understanding the claimed invention. While the illustrative embodiments have been described with particularity, it will be understood that various other modifications will be apparent to and can be readily made by those skilled in the art without departing from the spirit and scope of the invention. For determining infringement, the scope of the "invention" will refer to any one or more of the appended claims, including their equivalents and elements or limitations that are equivalent to those that are recited.

The inventors have discovered that preparing a functionalized hydrocarbon resin with groups capable of reacting with silica or carbon black and introducing a spacer group between the resin molecule and the reactive functional group results in advantageous properties for the resin for use in elastomeric compounds of high performance tire applications.

The term "phr" means parts per hundred parts of rubber, and is a measure common in the art wherein components of a composition are measured relative to the total of all of the elastomer (rubber) components. The total phr or parts for all rubber components, whether one, two, three, or more different rubber components is present in a given recipe is always defined as 100 phr. All other non-rubber components are ratioed against the 100 parts of rubber and are expressed in phr.

The term "interpolymer" means any polymer or oligomer having a number average molecular weight of 500 or more prepared by the polymerization or oligomerization of at least two different monomers, including copolymers, terpolymers, tetrapolymers, etc. As used herein, reference to monomers in an interpolymer is understood to refer to the as-polymerized and/or as-derivatized units derived from that monomer. The terms polymer and interpolymer are used broadly herein and in the claims to encompass higher oligomers having a number average molecular weight (Mn) equal to or greater than 500, as well as compounds that meet the molecular weight requirements for polymers according to classic ASTM definitions.

All resin component percentages listed herein are weight percentages, unless otherwise noted. "Substantially free" of a particular component in reference to a composition is defined to mean that the particular component comprises less than 0.5 wt % in the composition, or more preferably less than 0.25 wt % of the component in the composition, or most preferably less than 0.1 wt % of the component in the composition.

The term "elastomer," as used herein, refers to any polymer or combination of polymers consistent with the ASTM D1566 definition, incorporated herein by reference.

As used herein, the term "elastomer" may be used interchangeably with the term "rubber."

Functionalized Resin

The functionalized resin molecules of the present invention are prepared via metathesis methods known in the art.

Polymer Backbone

The phrase "polymer backbone" includes units derived from substituted or unsubstituted cyclopentadiene homopolymer or copolymer resins (referred to as CPD), dicyclopentadiene homopolymer or copolymer resins (referred to as DCPD or (D)CPD), terpene homopolymer or copolymer resins, pinene homopolymer or copolymer resins, $C_5$ fraction homopolymer or copolymer resins, $C_9$ fraction homopolymer or copolymer resins, alpha-methylstyrene homopolymer or copolymer resins, and combinations thereof. The polymer backbone may further include units derived from (D)CPD/vinylaromatic copolymer resins, (D)CPD/terpene copolymer resins, terpene/phenol copolymer resins, (D)CPD/pinene copolymer resins, pinene/phenol copolymer resins, (D)CPD/$C_5$ fraction copolymer resins, (D)CPD/$C_9$ fraction copolymer resins, terpene/vinylaromatic copolymer resins, terpene/phenol copolymer resins, pinene/vinylaromatic copolymer resins, pinene/phenol copolymer resins, $C_5$ fraction/vinylaromatic copolymer resins, and combinations thereof. The term "resin molecule" or "resin" as used herein is interchangeable with the phrase "polymer backbone."

The phrase "units derived from dicyclopentadiene" includes units derived from substituted DCPD such as methyl DCPD or dimethyl DCPD.

Preferably, the polymer comprising units derived from dicyclopentadiene (also referred to as the "DCPD polymer") have an Mw within the range from 150 to 10,000 g/mol (as determined by GPC), more preferably from 200 to 5,000 g/mol, most preferably from 300 to 1000 g/mol. While reference is made to a DCPD polymer, any polymer backbone comprised of units mentioned herein is suitable for the present invention.

Preferably, the polymer backbone comprises up to 100 mol % units derived from dicyclopentadiene, more preferably within the range from 5 to 90 mol % units derived from DCPD, most preferably from 5 to 70 mol % units derived from DCPD.

Preferably, the polymer backbone is made from a monomer mixture comprising up to 15% piperylene components, up to 15% isoprene components, up to 15% amylene components, up to 20% indene components, within the range from 60% to 100% cyclic components, and up to 20% styrenic components by weight of the monomers in the monomer mix.

Cyclic components are generally a distillate cut or synthetic mixture of $C_5$ and $C_6$ to $C_{15}$ cyclic olefins, diolefins, and dimers, co-dimers and trimers, etc., from a distillate cut. Cyclics include, but are not limited to, cyclopentene, cyclopentadiene, DCPD, cyclohexene, 1,3-cyclohexadiene, and 1,4-cyclohexadiene. A preferred cyclic is cyclopentadiene. The DCPD may be in either the endo or exo form. The cyclics may or may not be substituted. Preferred substituted cyclics include cyclopentadienes and DCPD substituted with a $C_1$ to $C_{40}$ linear, branched, or cyclic alkyl group, preferably one or more methyl groups. Preferably, the cyclic components are selected from the group consisting of: cyclopentadiene, cyclopentadiene dimer, cyclopentadiene trimer, cyclopentadiene-$C_5$ co-dimer, cyclopentadiene-piperylene co-dimer, cyclopentadiene-$C_4$ co-dimer, cyclopentadiene-methyl cyclopentadiene co-dimer, methyl cyclopentadiene, methyl cyclopentadiene dimer, and mixtures thereof.

Preferably, the polymer backbone has a refractive index greater than 1.5.

Preferably, the polymer backbone has a softening point of 80° C. or more (Ring and Ball, as measured by ASTM E-28) more preferably from 80° C. to 150° C., most preferably 100° C. to 150° C.

Preferably, the polymer backbone has a glass transition temperature (Tg) (as measured by ASTM E 1356 using a TA Instruments model 2920 machine) of from −30° C. to 100° C.

Preferably, the polymer backbone has a Brookfield Viscosity (ASTM D-3236) measured at the stated temperature (typically from 120° C. to 190° C.) using a Brookfield Thermosel viscometer and a number 27 spindle of 50 to 25,000 mPa·s at 177° C.

Preferably, the polymer backbone comprises olefinic unsaturation, e.g., at least 1 mol % olefinic hydrogen, based on the total moles of hydrogen in the interpolymer as determined by $^1$H-NMR. Alternatively, the polymer backbone comprises from 1 to 20 mol % aromatic hydrogen, preferably from 2 to 15 mol % aromatic hydrogen, more preferably from 2 to 10 mol % aromatic hydrogen, preferably at least 8 mol % aromatic hydrogen, based on the total moles of hydrogen in the polymer.

Preferably, the polymer backbone comprises aDCPD polymer as described in International Patent Application No. WO 2012/050658 A1.

Examples of polymer backbones useful in this invention include Escorez® 8000 series resins sold by ExxonMobil Chemical Company in Baton Rouge, La. Further examples of polymer backbones useful in this invention include Arkon® series resins sold by Arakawa Europe in Germany. Yet more examples of polymer backbones useful in this invention include the Eastotac® series of resins sold by Eastman Chemical Company in Longview, Tex.

In the present invention, the polymer backbone is represented by the term "P" in the formula P—S—X as described herein.

Silane

As used herein, the term "silane" means any silicon analog of a substituted or unsubstituted hydrocarbon. The term "silane structure" refers to any compound, moiety or group containing a tetravalent silicon atom.

In the present invention, the silane is represented by the term "X" in the formula P—S—X as described herein.

Spacer

As used herein, the term "spacer" or "spacer group" is meant to refer to any chemical group that bridges the resin molecule P and the functional group X. In certain embodiments, the spacer can be an alkane, alkene, or alkyene. In certain embodiments, the spacer is branched or straight-chained. In certain embodiments, the spacer can contain functional groups. In embodiments, the spacer is selected from the group consisting of $C_2$-$C_{40}$ straight chain and branched alkyl, $C_6$-$C_{40}$ aromatics, butadiene, isoprene, and combinations thereof.

Preferably, the silane with the spacer useful herein is represented by either of the following formulae (I):

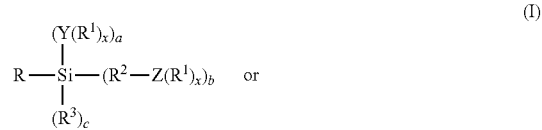

-continued

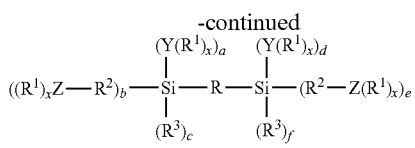

where each Y is independently a nitrogen, oxygen, or sulfur atom, each Z is independently a boron, nitrogen, oxygen, silicon, or sulfur atom, each R (representing the spacer S) is independently a monovalent (for the first formula of I) or a divalent (for the second formula of I) substituted or unsubstituted alkyl or aromatic group of from 1 to 20 carbon atoms containing at least one olefinic group, each $R^1$ is independently a hydrogen atom, or a substituted or unsubstituted alkyl or aromatic group of from 1 to 20 carbon atoms, each $R^2$ is independently a divalent substituted or unsubstituted alkyl or aromatic group of from 1 to 20 carbon atoms, each $R^3$ is independently a hydrogen atom, a halogen atom, a substituted or unsubstituted alkyl or aromatic group of from 1 to 20 carbon atoms, $R^1$, $R^2$, and $R^3$ may form single or multinuclear rings with each other, where a-f are independently integers of 1, 2, or 3, with the proviso that a+b+c and d+e+f are both equal to 3, and where independently for each Y and Z, if Z is a boron atom, then x=2, if Y or Z is a nitrogen atom, then x=2, if Y or Z is an oxygen atom or sulfur atom, then x=1, if Z is a silicon atom, then x=3

In the present invention, the spacer group is represented by the term "S" in the formula P—S—X as described herein.

Alkene Metathesis Catalysts

An alkene metathesis catalyst is a compound that catalyzes the reaction between a first olefin with a second olefin to produce a product, typically with the elimination of ethylene.

Preferably, the alkene metathesis catalyst useful herein is represented by the following formula (II):

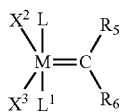

(II)

wherein, M is a Group 8 metal, preferably Ru or Os, preferably Ru; $X^2$ and $X^3$ are, independently, any anionic ligand, preferably a halogen (preferably chlorine), an alkoxide or a triflate, or $X^2$ and $X^3$ may be joined to form a dianionic group and may form single ring of up to 30 non-hydrogen atoms or a multinuclear ring system of up to 30 non-hydrogen atoms; L and $L^1$ are, independently, a neutral two electron donor, preferably a phosphine or a N-heterocyclic carbene, L and $L^1$ may be joined to form a single ring of up to 30 non-hydrogen atoms or a multinuclear ring system of up to 30 non-hydrogen atoms; L and $X^2$ may be joined to form a multidentate monoanionic group and may form a single ring of up to 30 non-hydrogen atoms or a multinuclear ring system of up to 30 non-hydrogen atoms; $L^1$ and $X^3$ may be joined to form a multidentate monoanionic group and may form a single ring of up to 30 non-hydrogen atoms or a multinuclear ring system of up to 30 non-hydrogen atoms; $R_5$ and $R_6$ are, independently, hydrogen or $C_1$ to $C_{30}$ substituted or unsubstituted hydrocarbyl (preferably a $C_1$ to $C_{30}$ substituted or unsubstituted alkyl or a substituted or unsubstituted $C_4$ to $C_{30}$ aryl); $R_6$ and $L^1$ or $X^3$ may be joined to form a single ring of up to 30 non-hydrogen atoms or a multinuclear ring system of up to 30 non-hydrogen atoms; and $R_5$ and L or $X^2$ may be joined to form a single ring of up to 30 non-hydrogen atoms or a multinuclear ring system of up to 30 non-hydrogen atoms.

Preferred alkoxides include those where the alkyl group is a phenol, substituted phenol (where the phenol may be substituted with up to 1, 2, 3, 4, or 5 $C_1$ to $C_{12}$ hydrocarbyl groups) or a $C_1$ to $C_{10}$ hydrocarbyl, preferably a $C_1$ to $C_{10}$ alkyl group, preferably methyl, ethyl, propyl, butyl, or phenyl.

Preferred triflates are represented by the following formula (III):

(III)

wherein, $R_7$ is hydrogen or a $C_1$ to $C_{30}$ hydrocarbyl group, preferably a $C_1$ to $C_{12}$ alkyl group, preferably methyl, ethyl, propyl, butyl, or phenyl.

Preferred N-heterocyclic carbenes are represented by the following formulae (IV):

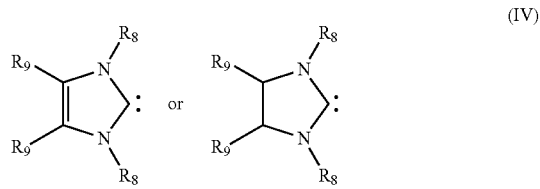

(IV)

where each $R_8$ is independently a hydrocarbyl group or substituted hydrocarbyl group having 1 to 40 carbon atoms, preferably methyl, ethyl, propyl, butyl (including isobutyl and n-butyl), pentyl, cyclopentyl, hexyl, cyclohexyl, octyl, cyclooctyl, nonyl, decyl, cyclodecyl, dodecyl, cyclododecyl, mesityl, adamantyl, phenyl, benzyl, tolulyl, chlorophenyl, phenol, substituted phenol, or $CH_2C(CH_3)_3$; and each $R_9$ is hydrogen, a halogen, or a $C_1$ to $C_{12}$ hydrocarbyl group, preferably hydrogen, bromine, chlorine, methyl, ethyl, propyl, butyl, or phenyl.

Alternatively, one of the N groups bound to the carbene in formulae (IV) is replaced with an S, O, or P atom, preferably an S atom.

Other useful N-heterocyclic carbenes include the compounds described in Hermann, W. A. Chem. Eur. J., 1996, 2, pp. 772 and 1627; Enders, D. et al., Angew. Chem. Int. Ed., 1995, 34, p. 1021; Alder R. W., Angew. Chem. Int. Ed., 1996, 35, p. 1121; and Bertrand, G. et al., Chem. Rev., 2000, 100, p. 39.

Preferably, the alkene metathesis catalyst used in the present invention is one or more of tricyclohexylphosphine [1,3-bis(2,4,6-trimethylphenyl)imidazol-2-ylidene][3-phenyl-1H-inden-1-ylidene]ruthenium(II) dichloride, tricyclohexylphosphine[3-phenyl-1H-inden-1-ylidene][1,3-bis(2,4,6-trimethylphenyl)-4,5-dihydro-imidazol-2-ylidene] ruthenium(II) dichloride, tricyclohexylphosphine[1,3-bis(2,4,6-trimethylphenyl)-4,5-dihydroimidazol-2-ylidene] [(phenylthio)methylene]ruthenium(II) dichloride, bis (tricyclohexylphosphine)-3-phenyl-1H-inden-1-ylideneruthenium(II) dichloride, 1,3-bis(2,4,6-trimethylphenyl)-4,5-dihydroimidazol-2-ylidene[2-(i- propoxy)-5-(N,N-dimethylaminosulfonyl)phenyl]methyleneruthenium(II) dichloride, and [1,3-Bis(2,4,6-trimethylphenyl)-2-imidazolidinylidene]-[2-[[(4-methylphenyl)imino]methyl]-4-nitrophenolyl]-[3-phenyl-1H-inden-1-ylidene]ruthenium(II) chloride. More preferably, the catalyst is 1,3-bis(2,4,6-trimethylphenyl)-4,5-dihydroimidazol-2-ylidene[2-(i-propoxy)-5-(N,N-dimethylaminosulfonyephenyl]methyleneruthenium(II) dichloride and/or tricyclohexylphosphine[3-phenyl-1H-inden-1-ylidene][1,3-bis(2,4,6-trimethylphenyl)-4,5-dihydroimidazol-2-ylidene]ruthenium(II) dichloride.

Functionalization Process

The reactants (including the polymer backbone P) are typically combined in a reaction vessel at a temperature of 20° C. to 200° C. (preferably 50° C. to 160° C., preferably 60° C. to 140° C.) and a pressure of 0 to 1000 MPa (preferably 0.5 to 500 MPa, preferably 1 to 250 MPa) for a residence time of 0.5 seconds to 10 hours.

Preferably, within the range from 0.00001 to 1.0 moles, more preferably 0.0001 to 0.05 moles, most preferably 0.0005 to 0.01 moles of catalyst are charged to the reactor per mole of polymer P charged.

Preferably, within the range from 0.01 to 10 moles of silane X, more preferably 0.05 to 5.0 moles, most preferably from 0.5 to 2.0 moles of silane are charged to the reactor per mole of polymer P charged.

The functionalization process is preferably a solution process, although it may be a bulk or high pressure process. Homogeneous processes are preferred. (A homogeneous process is defined to be a process where at least 90 wt % of the product is soluble in the reaction media.) A bulk homogeneous process is particularly preferred. (A bulk process is defined to be a process where reactant concentration in all feeds to the reactor is 70 vol % or more.) Alternately, no solvent or diluent is present or added in the reaction medium, (except for the small amounts used as the carrier for the catalyst or other additives, or amounts typically found with the reactants; e.g., propane in propylene).

Suitable diluents/solvents for the functionalization process include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof such as can be found commercially (Isopar™); perhalogenated hydrocarbons, such as perfluorinated $C_4$ to $C_{10}$ alkanes, chlorobenzene, and aromatic and alkyl-substituted aromatic compounds such as benzene, toluene, mesitylene, and xylene. In a preferred embodiment, aliphatic hydrocarbon solvents are preferred, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably aromatics are present in the solvent at less than 1 wt %, preferably at 0.5 wt %, preferably at 0 wt % based upon the weight of the solvents.

Alternatively, the functionalization process is a slurry process. As used herein the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent).

Preferably, the feed concentration for the functionalization process is 60 vol % solvent or less, more preferably 40 vol % or less, most preferably 20 vol % or less.

The functionalization process may be batch, semi-batch or continuous. As used herein, the term continuous means a system that operates without interruption or cessation. For example, a continuous process to produce a polymer would be one where the reactants are continually introduced into one or more reactors and polymer product is continually withdrawn.

Useful reaction vessels include reactors (including continuous stirred tank reactors, batch reactors, reactive extruder, pipe or pump).

Preferably, the productivity of the functionalization process is at least 200 g of functionalized polymer per mmol of catalyst per hour, preferably at least 5,000 g/mmol/hour, preferably at least 10,000 g/mmol/hr, preferably at least 300,000 g/mmol/hr.

This invention further relates to a process, preferably an in-line process, preferably a continuous process, to produce functionalized polymers, comprising introducing one or more monomers into a reactor to polymerize, obtaining a reactor effluent containing polymers, optionally removing (such as flashing off) solvent, unused monomer and/or other volatiles, obtaining the polymer backbone, introducing the polymer backbone, spacer group, a silane, and a metathesis catalyst into a reaction zone (such as a reactor, an extruder, a pipe and/or a pump), obtaining a reactor effluent containing functionalized polymers, optionally removing (such as flashing off) solvent, unused monomer and/or other volatiles, (such as those described herein), and obtaining functionalized polymers (such as those described herein). In an embodiment, the spacer group is attached to the silane (via methods known in the art) prior to introducing it into the reaction zone with the polymer backbone and the metathesis catalyst.

Metathesis products prepared herein can further be hydrogenated after completion or during reaction conditions.

The hydrogenation may be achieved in the presence of any of the known catalysts commonly used for hydrogenating petroleum resins. The catalysts which may be used in the hydrogenation step include the Group 10 metals such as nickel, palladium, ruthenium, rhodium, cobalt, and platinum, and the Group 6 metals such as tungsten, chromium and molybdenum, and the Group 11 metals such as rhenium, manganese, and copper. These metals may be used singularly or in a combination of two or more metals, in the metallic form or in an activated form, and may be used directly or carried on a solid support such as alumina or silica-alumina. A preferred catalyst is one comprising sulfided nickel-tungsten on a gamma-alumina support having a fresh catalyst surface area ranging from 120 to 300 $m^2/g$ and containing from 2% to 10% by weight nickel and from 10% to 25% by weight tungsten as described in U.S. Pat. No. 4,629,766. The hydrogenation is carried out with a hydrogen pressure of 20-300 atmospheres, preferably 150-250 atmospheres.

While the functionalized resins used in the examples in the present invention are prepared via metathesis chemistry, in an embodiment of the invention the resins can be prepared via free radical chemistry and/or hydrosilylation processes known in the art as well.

High Performance Tire Tread Compositions

The functionalized polymer produced by this invention can be used in a high performance tire tread composition.

The high performance tire tread composition is formed by blending the functionalized polymer produced by this invention with diene elastomer and inorganic filler. Preferably, the functionalized polymer is present within the range from 5 to 100 phr, more preferably 10 to 50 phr, most preferably 15 to 50 phr. The diene elastomer may comprise a blend of two or more elastomers. The individual elastomer components may be present in various conventional amounts, with the total diene elastomer content in the tire tread composition being expressed as 100 phr in the formulation. Preferably, the inorganic filler is present within the range from 50 to 150 phr, more preferably 50 to 100 phr, most preferably 70 to 90 phr.

Diene Elastomer

As used herein, the term "diene elastomer" is meant to refer to any viscoelastic polymer synthesized from hydrocarbon monomer comprising two carbon double bonds.

Examples of preferred diene elastomers include, but are not limited to natural rubber, polybutadiene rubber, polyisoprene rubber, styrene-butadiene rubber, isoprene-butadiene rubber, high cis-polybutadiene, ethylene-propylene rubber, ethylene-propylene-diene rubber, nitrile rubber, butyl rubber, halogenated butyl rubber, branched ("star-branched") butyl rubber, halogenated star-branched butyl rubber, poly(isobutylene-co-p-methylstyrene), brominated butyl rubber, chlorinated butyl rubber, star-branched polyisobutylene rubber, and mixtures thereof. Blends of these diene elastomers may be reactor blends and/or melt mixes. Particularly preferred diene elastomers include polybutadiene rubber and styrene-butadiene rubber. Preferably, the styrene-butadiene rubber has a styrene content of 25 wt %. A preferred styrene-butadiene rubber is commercially available by Lanxess as Buna™ VSL 5025-2.

Inorganic Filler

The term "filler" as used herein refers to any material that is used to reinforce or modify physical properties, impart certain processing properties, or reduce cost of an elastomeric composition.

Examples of preferred filler include, but are not limited to, calcium carbonate, clay, mica, silica, silicates, talc, titanium dioxide, alumina, zinc oxide, starch, wood flour, carbon black, or mixtures thereof. The fillers may be any size and typically range, for example in the tire industry, from 0.0001 μm to 100 μm.

As used herein, the term "silica" is meant to refer to any type or particle size silica or another silicic acid derivative, or silicic acid, processed by solution, pyrogenic, or the like methods, including untreated, precipitated silica, crystalline silica, colloidal silica, aluminum or calcium silicates, fumed silica, and the like. Precipitated silica can be conventional silica, semi-highly dispersible silica, or highly dispersible silica. A preferred filler is commercially available by Rhodia Company under the trade name Zeosil™ Z1165.

Coupling Agent

As used herein, the term "coupling agent" is meant to refer to any agent capable of facilitating stable chemical and/or physical interaction between two otherwise non-interacting species, e.g., between a filler and a diene elastomer. Coupling agents cause silica to have a reinforcing effect on the rubber. Such coupling agents may be pre-mixed, or pre-reacted, with the silica particles or added to the rubber mix during the rubber/silica processing, or mixing, stage. If the coupling agent and silica are added separately to the rubber mix during the rubber/silica mixing, or processing stage, it is considered that the coupling agent then combines in situ with the silica.

The coupling agent may be a sulfur-based coupling agent, an organic peroxide-based coupling agent, an inorganic coupling agent, a polyamine coupling agent, a resin coupling agent, a sulfur compound-based coupling agent, oxime-nitrosamine-based coupling agent, and sulfur. Among these, preferred for a rubber composition for tires is the sulfur-based coupling agent.

In an embodiment, the coupling agent is at least bifunctional. Non-limiting examples of bifunctional coupling agents include organosilanes or polyorganosiloxanes. Other examples of suitable coupling agents include silane polysulfides, referred to as "symmetrical" or "unsymmetrical" depending on their specific structure. Silane polysulphides can be described by the formula (V)

$$Z-A-S_x-A-Z \qquad (V)$$

in which x is an integer from 2 to 8 (preferably from 2 to 5); the A symbols, which are identical or different, represent a divalent hydrocarbon radical (preferably a $C_1$-$C_{18}$ alkylene group or a $C_6$-$C_{12}$ arylene group, more particularly a $C_1$-$C_{10}$, in particular $C_1$-$C_4$, alkylene, especially propylene); the Z symbols, which are identical or different, correspond to one of the three formulae (VI):

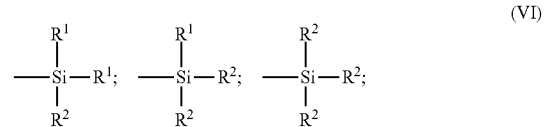

in which the $R^1$ radicals, which are substituted or unsubstituted and identical to or different from one another, represent a $C_1$-$C_{18}$ alkyl, $C_5$-$C_{18}$ cycloalkyl or $C_6$-$C_{18}$ aryl group (preferably $C_1$-$C_6$ alkyl, cyclohexyl or phenyl groups, in particular $C_1$-$C_4$ alkyl groups, more particularly methyl and/or ethyl); the $R^2$ radicals, which are substituted or unsubstituted and identical to or different from one another, represent a $C_1$-$C_{18}$ alkoxyl or $C_5$-$C_{18}$ is cycloalkoxyl group (preferably a group selected from $C_1$-$C_8$ alkoxyls and $C_5$-$C_8$ cycloalkoxyls, more preferably still a group selected from $C_1$-$C_4$ alkoxyls, in particular methoxyl and ethoxyl).

International Patent Application Nos. WO 03/002648 and WO 03/002649 further disclose silane polysulfides. Non-limiting examples of silane polysulphides include bis(($C_1$-$C_4$)alkoxy($C_1$-$C_4$)alkylsilyl($C_1$-$C_4$)alkyl)polysulphides (in particular disulphides, trisulphides or tetrasulphides), such as, for example, bis(3-trimethoxysilylpropyl) or bis(3-triethoxysilylpropyl)polysulphides. Further examples include bis(3-triethoxysilylpropyl)tetrasulphide, abbreviated to TESPT, of formula $[(C_2H_5O)_3Si(CH_2)_3S_2]_2$, or bis(triethoxysilylpropyl)disulphide, abbreviated to TESPD, of formula $[(C_2H_5O)_3Si(CH_2)_3S]_2$. Other examples include bis(mono($C_1$-$C_4$)alkoxyldi($C_1$-$C_4$)alkylsilylpropyl)polysulphides (in particular disulphides, trisulphides or tetrasulphides), more particularly bis(monoethoxydimethylsilylpropyl)tetrasulphide, such as described in International Patent Application No. WO 02/083782.

The coupling agent can also be bifunctional POSs (polyorganosiloxanes), or hydroxysilane polysulphides, as described in International Patent Application Nos. WO 02/30939, WO 02/31041 and WO2007/061550, or silanes or POSs bearing azodicarbonyl functional groups, as described in International Patent Application Nos. WO 2006/125532, WO 2006/125533 and WO 2006/125534. The coupling agent can also include other silane sulphides, for example, silanes having at least one thiol (—SH) functional group (referred to as mercaptosilanes) and/or at least one masked thiol functional group, as described in U.S. Pat. No. 6,849, 754, and international Patent Nos. WO 99/09036, WO 2006/023815, WO 2007/098080, WO 2008/055986 and WO 2010/072685.

The coupling agent can also include combinations of one at more coupling agents described herein, as further described in International Patent Application No. WO 2006/125534. A preferred coupling agent comprises alkoxysilane or polysulphurized alkoxysilane. A particularly preferred polysulphurized alkoxysilane is bis(triethoxysilylpropyl) tetrasulphide, which is commercially available by Degussa under the trade name X50S™.

Plasticizer

As used herein, the term "plasticizer" (also referred to as a processing oil), refers to a petroleum derived processing oil and synthetic plasticizer. Such oils are primarily used to improve the processability of the composition. Suitable plasticizers include, but are not limited to, aliphatic acid esters or hydrocarbon plasticizer oils such as paraffinic oils, aromatic oils, naphthenic petroleum oils, and polybutene oils. A particularly preferred plasticizer is naphthenic oil, which is commercially available by Nynas under the trade name Nytex™ 4700.

Antioxidant

As used herein, the term "antioxidant" refers to a chemical that combats oxidative degradation. Suitable antioxidants include diphenyl-p-phenylenediamine and those disclosed in *The Vanderbilt Rubber Handbook* (1978), Pages 344 to 346. A particularly preferred antioxidant is para-phenylenediamines, which is commercially available by Eastman under the trade name Santoflex™ 6PPD.

Crosslinking Agents, Curatives, Cure Packages, and Curing Processes

The elastomeric compositions and the articles made from those compositions are generally manufactured with the aid of at least one cure package, at least one curative, at least one crosslinking agent, and/or undergo a process to cure the elastomeric composition. As used herein, at least one curative package refers to any material or method capable of imparting cured properties to a rubber as is commonly understood in the industry. A preferred agent is sulfur.

Processing

The inventive tire tread composition may be compounded (mixed) by any conventional means known to those skilled in the art. The mixing may occur in a single step or in multiple stages. For example, the ingredients are typically mixed in at least two stages, namely at least one non-productive stage followed by a productive mixing stage. The terms "non-productive" and "productive" mix stages are well known to those having skill in the rubber mixing art. The elastomers, polymer additives, silica and silica coupler, and carbon black, if used, are generally mixed in one or more non-productive mix stages. Most preferably, the polymers are mixed first at 110° C. to 130° C. for 30 seconds to 2 minutes, followed by addition of the silica, silica coupler and other ingredients, the combination of which is further mixed, most preferably at an increasing temperature up to 140° C. to 160° C. for 30 seconds to 3 or 4 minutes. Most desirably the silica is mixed in portions, most preferably one half, then the second half. The final curatives are typically mixed in the productive mix stage. In the productive mix stage, the mixing typically occurs at a temperature, or ultimate temperature, lower than the mix temperature(s) of the preceding non-productive mix stage(s).

Cure Properties

Cure properties were measured using MDR 2000 from Alpha Technologies, Inc. at 160° C. based on ASTM D-2084. "MH" and "ML" used herein refer to "maximum torque" and "minimum torque," respectively. "Delta Torque" used herein refers to the difference between MH and ML.

Static Mechanical Properties

Tire tread compositions formed from the functionalized resins of the present invention exhibit superior static mechanical properties measured via stress/strain analysis in accordance with ISO 37:2011, indicating improved durability.

Dynamic Mechanical Properties

Tire tread compositions formed from the functionalized resins of the present invention exhibit superior dynamic mechanical properties measured via dynamic mechanical analysis (DMA) at 100° C., 14% strain, and 5 Hz in accordance with ASTM D7605, indicating improved durability, traction, and handling.

Tan delta at 100° C. can be used as an indicator of tire grip and other enhanced performance characteristics under extreme use conditions.

EXAMPLES

The ruthenium catalyst used in Example 1 is 1,3-bis(2,4,6-trimethylphenyl)-4,5-dihydroimidazol-2-ylidene[2-(i-propoxy)-5-(N,N-dimethylaminosulfonyl)phenyl]methyleneruthenium(II) dichloride.

Example 1

Preparation of DCPD-F

The preparation of functionalized resins according to the present invention can be illustrated as follows.

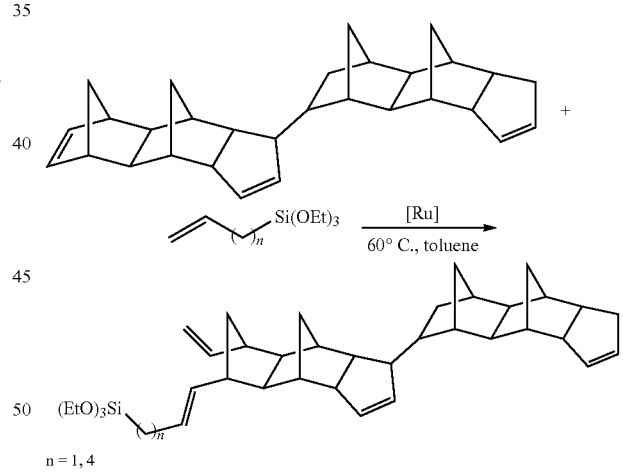

n = 1, 4

In the glove box, a 100 mL round-bottomed flask was charged with a polymer backbone (Escorez™ E8400 for E1 and E2 and Escorez™ 5415 for C) (10 g), toluene (solvent) (50 mL), and a stir bar. While stirring, the solution was heated to 60° C. After all of the resin had dissolved, a spacer group functionalized with silane (allyl triethoxysilane (2.88 mL) (for inventive example E2) or hexenyl triethoxysilane (3.56 mL) (for inventive example E1)) was added, followed by the ruthenium catalyst (0.387 g). Comparative example C contains no spacer group and a different polymer backbone After stirring at 60° C. for 18 h, the mixture was poured into rapidly stirring methanol (300 mL) and filtered. The solids were dried in a vacuum oven at 35° C. for 16 h.

Example 2

Preparation of Tire Tread Compositions C & E1-E2

Comparative tire tread composition C and inventive tire tread compositions E1-E2 were obtained by first mixing 15 phr of the resin type shown in Table 1 with the ingredients listed in Table 2 (all amounts given in phr) in a Brabender™ mixer. All of the examples, C, E1 and E2, contain the same amount and type of diene elastomers, filler, coupling agent, oil, and antioxidant.

This first mix cycle was as follows: 1) mixer rotor speed was set at 25 RPM, temperature at 120° C.; all the ingredients were added and the rpms were adjusted to maintain a batch temperature with the range from 151-153° C. for one minute.

TABLE 1

|  | C | E1 | E2 |
|---|---|---|---|
| Resin Type | DCPD-H2 | DCPD-F | DCPD-F |
| Trade Name | Escorez™ 5415 | Escorez™ 8400 | Escorez™ 8400 |
| Spacer | — | $C_6H_{10}$ | $C_3H_4$ |

TABLE 2

| Ingredient | Trade Name | C | E1 | E2 |
|---|---|---|---|---|
| Styrene-butadiene rubber (elastomer) | Buna™ VSL 5025-2 | 60 | 60 | 60 |
| Silica (filler) | Zeosil™ Z1165 | 70 | 70 | 70 |
| Polybutadiene (elastomer) | Taktene™ 1203 | 40 | 40 | 40 |
| Polysulphurized alkoxysilane supported on carbon black (coupling agent) | Degussa X50S | 5.6 | 5.6 | 5.6 |
| naphthenic oil | Nytex™ 4700 | 20 | 20 | 20 |
| Antioxidant | Santoflex™ 6PPD | 2 | 2 | 2 |

The resulting compounds were cooled and then blended using the same Brabender™ mixer with curatives in the amounts shown in Table 3 (all amounts given in phr). All of the examples, C and E1-E2, contain the same cure package. This second pass was performed as follows: 1) mixer rotor speed was set at 35 RPM, temperature at 70° C.; 2) add compound from first pass and mix for 30 seconds; 3) add curatives and mix for six minutes and 30 seconds; and 4) remove batch for a total mixing time of seven minutes from the addition of the compound.

TABLE 3

|  | C | E1 | E2 |
|---|---|---|---|
| Stearic acid | 2.5 | 2.5 | 2.5 |
| Zinc oxide | 2.5 | 2.5 | 2.5 |
| Sulfur (crosslinking agent) | 1.4 | 1.4 | 1.4 |
| Santocure™ CBS (rubber accelerator) | 1.7 | 1.7 | 1.7 |
| Perkacit™ DPG (rubber accelerator) | 2 | 2 | 2 |

Example 3

Cure Properties and Static Mechanical Properties of C & E1-E2

To determine static mechanical stress/strain properties (tensile strength, elongation at break, modulus values) of the comparative and inventive materials, compositions C and E1-E2 were first compression molded and cured into plaques at 160° C. for t90 (MDR)+5 minutes mold lag time. Dogbone shaped samples were dried out of these plaques using British standard dies (type 2). Stress/strain measurements were then performed in accordance with ISO 37:2011.

The results of these cure and stress/strain measurements are summarized in Table 4.

TABLE 4

|  | C | E1 | E2 |
|---|---|---|---|
| ML (dNm) | 7.6 | 3.6 | 4.1 |
| MH (dNm) | 31.1 | 30.0 | 28.5 |
| Delta Torque (dNm) | 23.5 | 26.4 | 24.4 |
| Modulus' at 200% strain (psi) | 686 | 828 | 897 |
| Ultimate tensile strength (psi) | 2223 | 2277 | 2191 |
| Ultimate elongation (%) | 479 | 466 | 444 |

The inventive materials E1 and E2 show lower ML values compared to the comparative C, demonstrating improved silica dispersion. E1 and E2 show a larger modulus at 200% than C, demonstrating improved durability. E1 and E2 show tensile and elongation values comparable to that of C.

Example 4

Dynamic Mechanical Properties of C & E1-E2

The dynamic mechanical properties of the inventive and comparative materials, measured at 100° C., are summarized in Table 5.

TABLE 5

|  | C | E1 | E2 |
|---|---|---|---|
| G' at 14% (kPa) | 1363 | 1672 | 1691 |
| tan delta at 14% | 0.169 | 0.243 | 0.246 |

Inventive materials E1 and E2 show a larger G' at 14% and tan delta at 14%, demonstrating improved durability, traction, and handling over the comparative material C during heavy handling.

INDUSTRIAL APPLICABILITY

The compositions of the invention may be extruded, compression molded, blow molded, injection molded, and laminated into various shaped articles including fibers, films, laminates, layers, industrial parts such as automotive parts, appliance housings, consumer products, packaging, and the like.

In particular, the compositions comprising the resin are useful in a variety of tire applications such as truck tires, bus tires, automobile tires, motorcycle tires, off-road tires, aircraft tires, and the like. Such tires can be built, shaped, molded, and cured by various methods which are known and will be readily apparent to those having skill in the art. The compositions may be fabricated into a component of a finished article for a tire. The component may be any tire component treads, sidewalls, chafer strips, tie gum layers, other reinforcing cord coating materials, cushion layers, and the like.

The compositions comprising the resin of the present invention are useful in a variety of applications, particularly tire curing bladders, inner tubes, air sleeves, hoses, belts such as conveyor belts or automotive belts, solid tires, footwear components, rollers for graphic arts applications, vibration isolation devices, pharmaceutical devices, adhesives, caulks, sealants, glazing compounds, protective coatings, air cushions, pneumatic springs, air bellows, accumulator bags, and various bladders for fluid retention and curing processes. They are also useful as plasticizers in rubber formulations; as components to compositions that are manufactured into stretch-wrap films; as dispersants for lubricants; and in potting and electrical cable filling and cable housing materials.

The compositions comprising the resin may also be useful in molded rubber parts and may find wide applications in automobile suspension bumpers, auto exhaust hangers, and body mounts. In yet other applications, compositions of the invention are also useful in medical applications such as pharmaceutical stoppers and closures and coatings for medical devices.

Certain embodiments and features have been described using a set of numerical upper limits and a set of numerical lower limits. It should be appreciated that ranges from any lower limit to any upper limit are contemplated unless otherwise indicated. Certain lower limits, upper limits, and ranges appear in one or more claims below. All numerical values are "about" or "approximately" the indicated value, and take into account experimental error and variations that would be expected by a person having ordinary skill in the art.

To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

The invention claimed is:

1. A functionalized resin composition having the formula (I)

where S is a spacer selected from at least one of $C_2$-$C_{40}$ straight chain and branched alkyl, $C_6$-$C_{40}$ aromatics, butadiene, isoprene, and combinations thereof, P is a polymer backbone selected from at least one of dicyclopentadiene (DCPD)-based polymers, cyclopentadiene (CPD)-based polymers, DCPD-styrene copolymers, $C_5$ homopolymers and copolymer resins, $C_5$-styrene copolymer resins, terpene homopolymer or copolymer resins, pinene homopolymer or copolymer resins, $C_9$ homopolymers and copolymer resins, $C_5$/$C_9$ copolymer resins, alpha-methylstyrene homopolymer or copolymer resins, and combinations thereof, and X is a silane;

wherein P, S, and X are contacted in the presence of a metathesis catalyst to produce the functionalized resin composition, wherein the metathesis catalyst comprises tricyclohexylphosphine[1,3-bis(2,4,6-trimethylphenyl)imidazol-2-ylidene][3-phenyl-1H-inden-1-ylidene]ruthenium(II) dichloride, tricyclohexylphosphine[3-phenyl-1H-inden-1-ylidene][1,3-bis(2,4,6-trimethylphenyl)-4,5-dihydro-imidazol-2-ylidene]ruthenium(II) dichloride, tricyclohexylphosphine[1,3-bis(2,4,6-trimethylphenyl)-4,5-dihydroimidazol-2-ylidene][(phenylthio)methylene]ruthenium(II) dichloride, bis(tricyclohexylphosphine)-3-phenyl-1H-inden-1-ylideneruthenium(II) dichloride, 1,3-bis(2,4,6-trimethylphenyl)-4,5-dihydroimidazol-2-ylidene[2-(i-propoxy) -5-(N,N-dimethylaminosulfonyl)phenyl]methyleneruthenium(II) dichloride, [1,3-bis(2,4,6-trimethylphenyl)-2-imidazolidinylidene]-[2-[[(4-methylphenyl)imino]methyl]-4-nitrophenolyl]-[3-phenyl-1H-inden-1-ylidene]ruthenium(II) chloride, and fluoride and bromide derivatives thereof, or a mixture of any of the above.

2. The functionalized resin composition of claim 1, wherein X is of the formulae

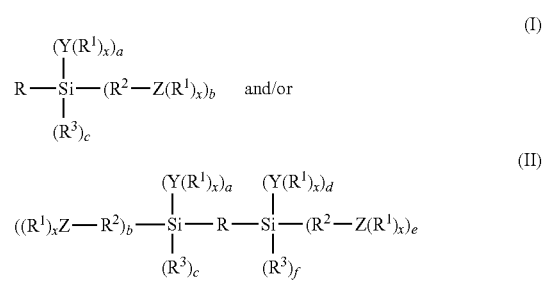

where each Y is independently a nitrogen, oxygen, or sulfur atom, each Z is independently a boron, nitrogen, oxygen, silicon, or sulfur atom, each R is independently a monovalent (for I) or a divalent (for II) substituted or unsubstituted alkyl or aromatic group of from 1 to 20 carbon atoms containing at least one olefinic group, each $R^1$ is independently a hydrogen atom, or a substituted or unsubstituted alkyl or aromatic group of from 1 to 20 carbon atoms, each $R^2$ is independently a divalent substituted or unsubstituted alkyl or aromatic group of from 1 to 20 carbon atoms, each $R^3$ is independently a hydrogen atom, a halogen atom, a substituted or unsubstituted alkyl or aromatic group of from 1 to 20 carbon atoms, $R^1$, $R^2$, and $R^3$ may form single or multinuclear rings with each other, where a-f are independently integers of 1, 2, or 3, with the proviso that a+b+c and d+e+f are both equal to 3, and where independently for each Y and Z, if Z is a boron atom, then x=2, if Y or Z is a nitrogen atom, then x=2, if Y or Z is an oxygen atom or sulfur atom, then x=1, if Z is a silicon atom, then x=3;

wherein each R is the spacer S.

3. The functionalized resin composition of claim 1, wherein P comprises:

(i) within the range from 60-100 wt % cyclic components;

(ii) less than or equal to 15 wt % components derived from piperylene;
(iii) less than or equal to 15 wt % components derived from amylene;
(iv) less than or equal to 15 wt % components derived from isoprene;
(v) less than or equal to 20 wt % components derived from styrene; and
(vi) less than or equal to 20 wt % components derived from indene.

4. A tire tread composition comprising the functionalized resin composition of claim 1.

* * * * *